Patented Mar. 4, 1941

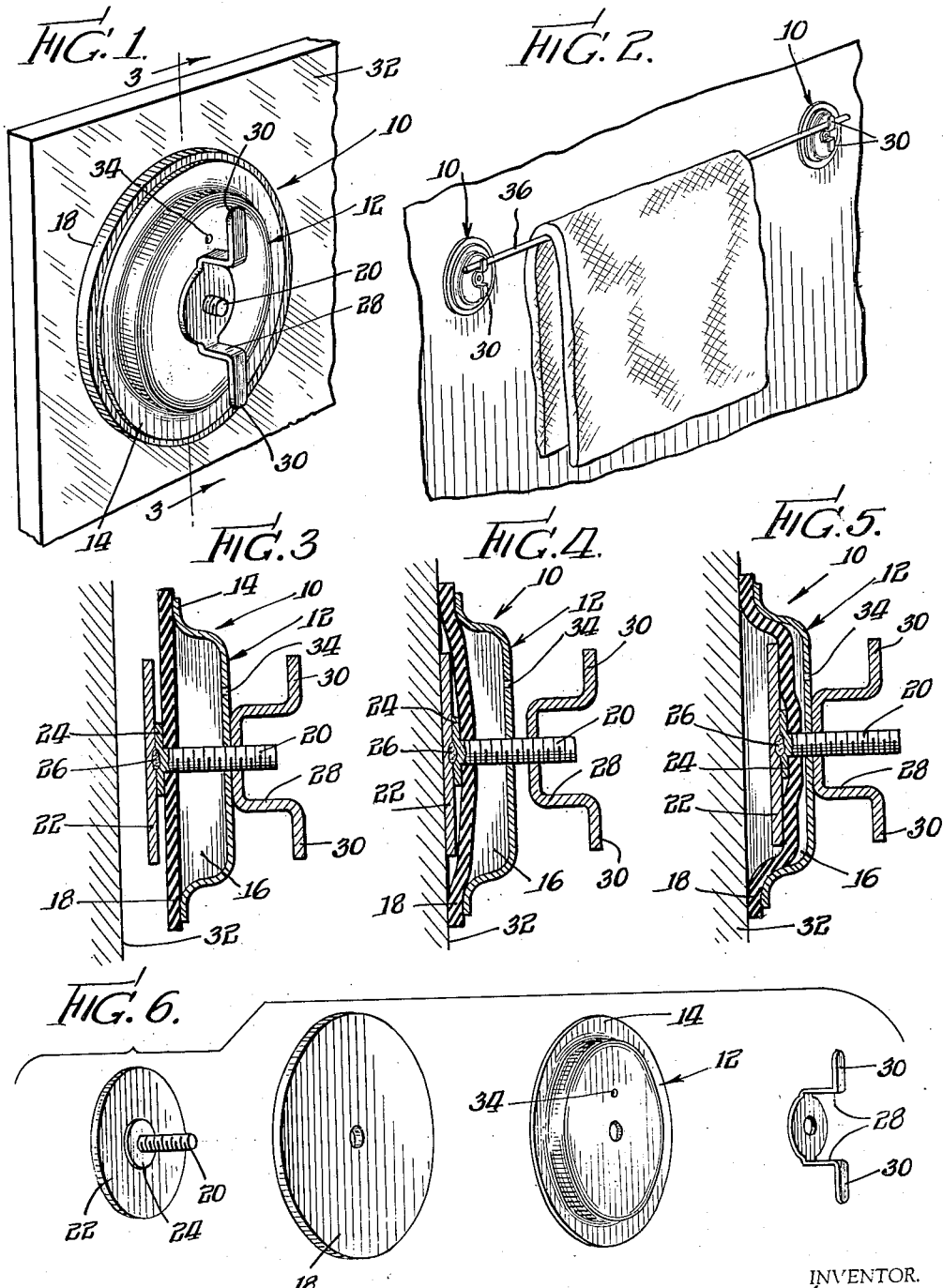

2,233,870

UNITED STATES PATENT OFFICE 2,233,870

SUCTION TYPE FASTENER

Leslie F. Muter, Chicago, Ill., assignor to The Muter Company, Chicago, Ill., a corporation of Illinois Application February 6, 1940, Serial No. 317,567

1 Claim. (Cl. 248—206)

This invention relates generally to a suction type fastener and more particularly to a suction type fastener wherein the gripping effectiveness of a diaphragm may be produced after it has been initially applied to a surface.

The present invention more particularly concerns a gripping device of the suction cup type wherein a portion of a resilient cup or diaphragm may be urged away from the surface to which it is applied so as to produce a relatively high vacuum beneath the cup and thereby establish the required holding or gripping effectiveness. The suction device contemplated by the present invention presents structural and functional characteristics which constitute distinct improvements over commercial suction devices with which I am familiar.

More specifically, the invention contemplates a suction device of extremely simple practical design employing a minimum number of constituent parts and capable of being manufactured by the practice of conventional machine shop methods.

I propose to provide a device of the type referred to above which will serve as a very effective and conveniently attachable support in instances where it is desired to secure a part in a fixed position with respect to a relatively smooth surface without subjecting said surface to any disfigurement and at the same time insure permanence in attachment.

The foregoing and numerous other objects and advantages will be apparent from the following detailed description when considered in connection with the accompanying drawing, wherein:

Fig. 1 is a perspective view of a suction type fastener embodying the present invention, said device being shown in operative association with a plate;

Fig. 2 is a fragmentary perspective view disclosing a pair of suction type fasteners of the type shown in Fig. 1 employed as supporting means for a member or rod extending therebetween;

Fig. 3 is a vertical sectional view of the fastener shown in Figs. 1 and 2 just prior to its application to a work surface;

Fig. 4 discloses the fastener after it has been initially pressed against said work surface;

Fig. 5 discloses the fastener after the shiftable stud thereof has been moved outwardly so as to produce the vacuum condition within the diaphragm and thereby establish the gripping effectiveness of said diaphragm; and Fig. 6 is an exploded perspective view of the parts constituting the aforesaid suction type fastener.

Referring now to the drawing more in detail wherein like numerals have been employed to designate similar parts throughout the various figures, it will be seen that one embodiment of the present invention resides in a suction type fastener denoted generally by the numeral 10. This fastener 10 includes a cupped member 12 having an annular flange 14, and providing a relatively shallow chamber 16. Superimposing the open side of said chamber 16 and bearing against the annular flange 14 is a diaphragm 18 formed preferably of rubber or other suitable resilient material.

A threaded stud 20 is positioned centrally of and extends through the diaphragm 18 and the cupped member 12. An enlarged section or disc element 22 is provided at one extremity of the threaded stud and is positioned so as to superimpose or overlie the suction creating side of the diaphragm 18. I have found in practical to provide the enlargement at one extremity of the threaded stud by welding a disc to the smaller head section 24 formed integral with the stud 20, as clearly shown in Figs. 3 to 5, inclusive. The weld just referred to is designated by the numeral 26. The opposite extremity of the threaded stud 20 accommodates a nut 28 which is preferably formed from sheet metal and is formed with oppositely disposed extensions 30.

When not in use the constituent parts of the fastener 10 preferably occupy the position shown in Fig. 3. When the fastener is brought into contact with the surface of a plate 32, the nut 28 is loosened so as to permit initial movement of the stud 20 to the position shown in Fig. 4. The stud is freely slidable within the cupped member 12 so that when the disc element 22 engages the work surface 32 the diaphragm 18 will be flexed inwardly and the annular flange 14 will bear against the adjacent annular portion of the diaphragm and thereby seal the opposite annular area of the diaphragm against the surface 32. It may be desirable in some instances to wet the outer annular surface of the diaphragm just prior to its application to the work surface in order to increase the sealing effectiveness of the diaphragm.

After the fastener 10 has been initially associated with the work surface, the nut 28 is tightened against the flat outer surface of the cupped member 12 and by continued rotation the stud 20 and the enlarged section or disc element 22 are shifted axially to the position illustrated in Fig. 5. This shifting of the disc element 22 causes a higher vacuum condition to be established between the diaphragm and the work surface, thereby increasing the gripping or holding effectiveness of the diaphragm. Attention is directed to the fact that the disc element 22 not only provides a very effective means for engaging a substantial portion of the diaphragm so as to effectively urge the diaphragm away from the work surface, but also provides an effective seal due to the engagement of the disc element with the complementary surface of the diaphragm. This sealing engagement of the enlarged section or disc element 22 with the diaphragm 18 is initiated when the fastener assumes the position shown in Fig. 4 and as the nut continues to be tightened against the cupped member 12 the pressure of the disc member 22 against the diaphragm obviously increases and thereby proportionately increases the sealing effectiveness thereof. It will also be noted that the disc element 22 is of substantial diameter with respect to the internal diameter of the chamber 16, thereby assuring a relatively large vacuum chamber, as clearly illustrated in Fig. 5. To facilitate air egress as the stud is shifted in response to the tightening of the nut 28, a vent 34 is provided in the cupped member 12.

In order to more clearly illustrate the simplicity in construction and the relatively small number of constituent parts, an exploded illustration thereof is shown in Fig. 6. There are, in fact, four parts, all of which are capable of being produced by the practice of simple and well-known methods of manufacture. While the stud and enlarged section or disc element as disclosed herein contemplates welding a disc member to a stud head, it will be understood that other unitary structures may be employed without departing from the present invention. In fact, a stud may be used having an enlarged section formed integral therewith which is of a size corresponding to the disc element 22.

The cupped member and nut may be formed from flat stock by simple stamping and forming operations, while the resilient disc member or diaphragm 18 may be formed from a sheet of rubber of uniform thickness. By employing the arrangement of parts described herein, the practice of relatively expensive molding and forming processes is eliminated and the parts may be quickly assembled. The fastener device 10 has a wide range of uses, and in fact may be employed in any instance where it is desired to provide a support on a relatively smooth surface without in any way disfiguring said surface. In Fig. 1 the device is shown as applied to a smooth flat surface of the work and in this position the nut extensions 30 provide hooks or hanger members. One use to which these hanger members may be put is illustrated in Fig. 2 where a bar or rod 36 is supported at its opposite extremities by said hooks, so as to provide a towel rack. Obviously, the nut may also be used to clamp various forms of supports or elements against the outer surface of the cupped member 12. In other words, the structural arrangement of the fastener and the uses for which it is adapted are not limited by the disclosure herein. Obviously, changes in structure may be made without departing from the spirit and scope of the appended claim.

The invention is hereby claimed as follows:

A suction type fastener including a relatively thin rubber-like diaphragm of substantially uniform thickness, a cupped member superimposing one side of said diaphragm, said cupped member having a relatively large recess with respect to the transverse dimension of the diaphragm and being provided with a relatively narrow outwardly extending flange bearing against said diaphragm but terminating in a free outwardly extending margin, a centrally positioned stud extending through the diaphragm, an enlarged section at one end of said stud overlying the vacuum creating side of the diaphragm, said section being relatively large with respect to said recess and being adapted to substantially transversely occupy said recess when actuated to shift the diaphragm thereinto, said stud extending through said cupped member, and means cooperatively associated with said stud and cupped member for imparting motion to said enlarged section to produce the vacuum condition within the diaphragm, the diameter of the diaphragm with respect to the outer diameter of the flange being sufficiently large to insure sealing engagement of the flange with the diaphragm when the stud is actuated to urge the central portion of the diaphragm into the cup.

LESLIE F. MUTER.